United States Patent Office 3,073,091
Patented Jan. 15, 1963

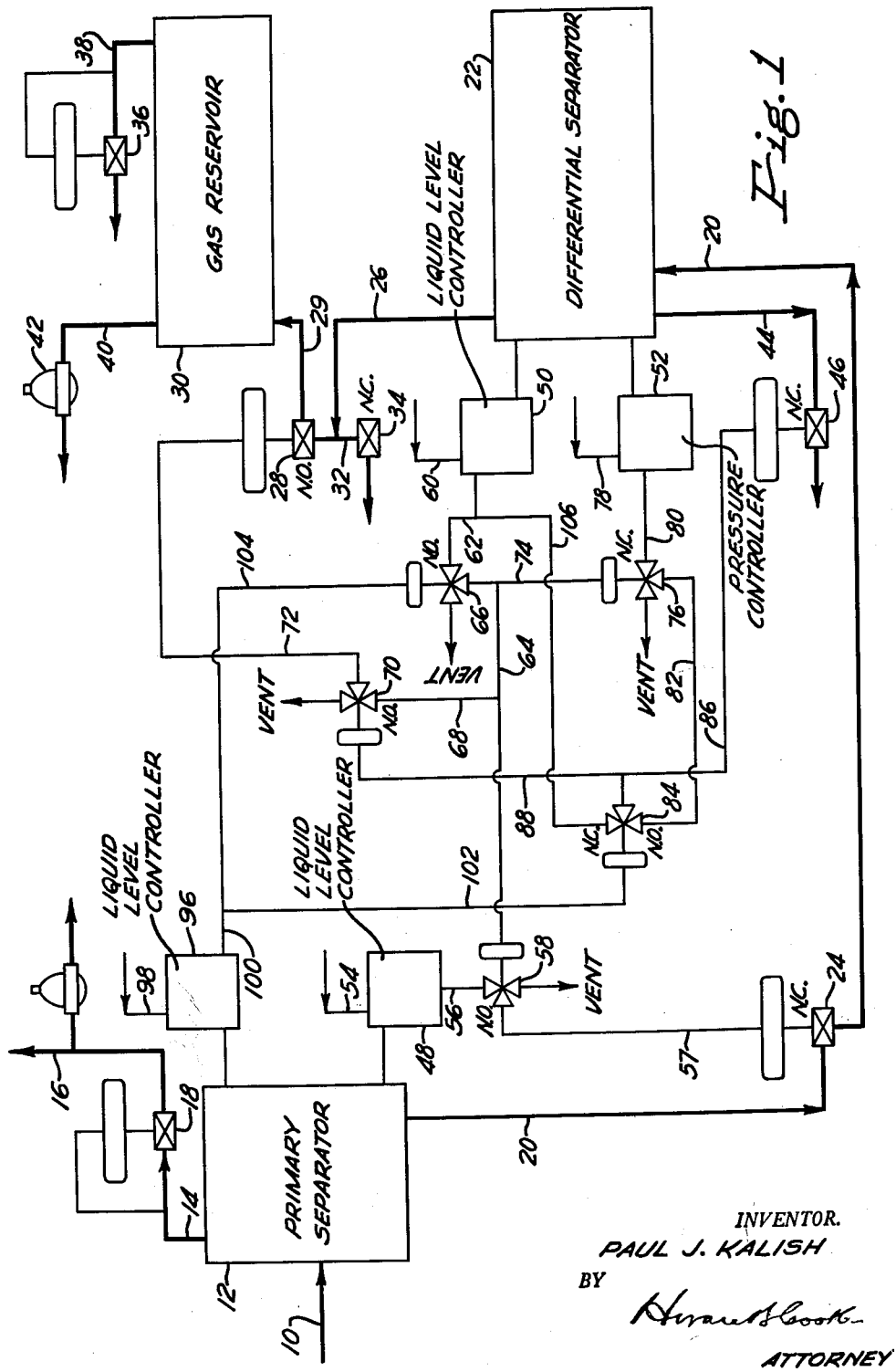

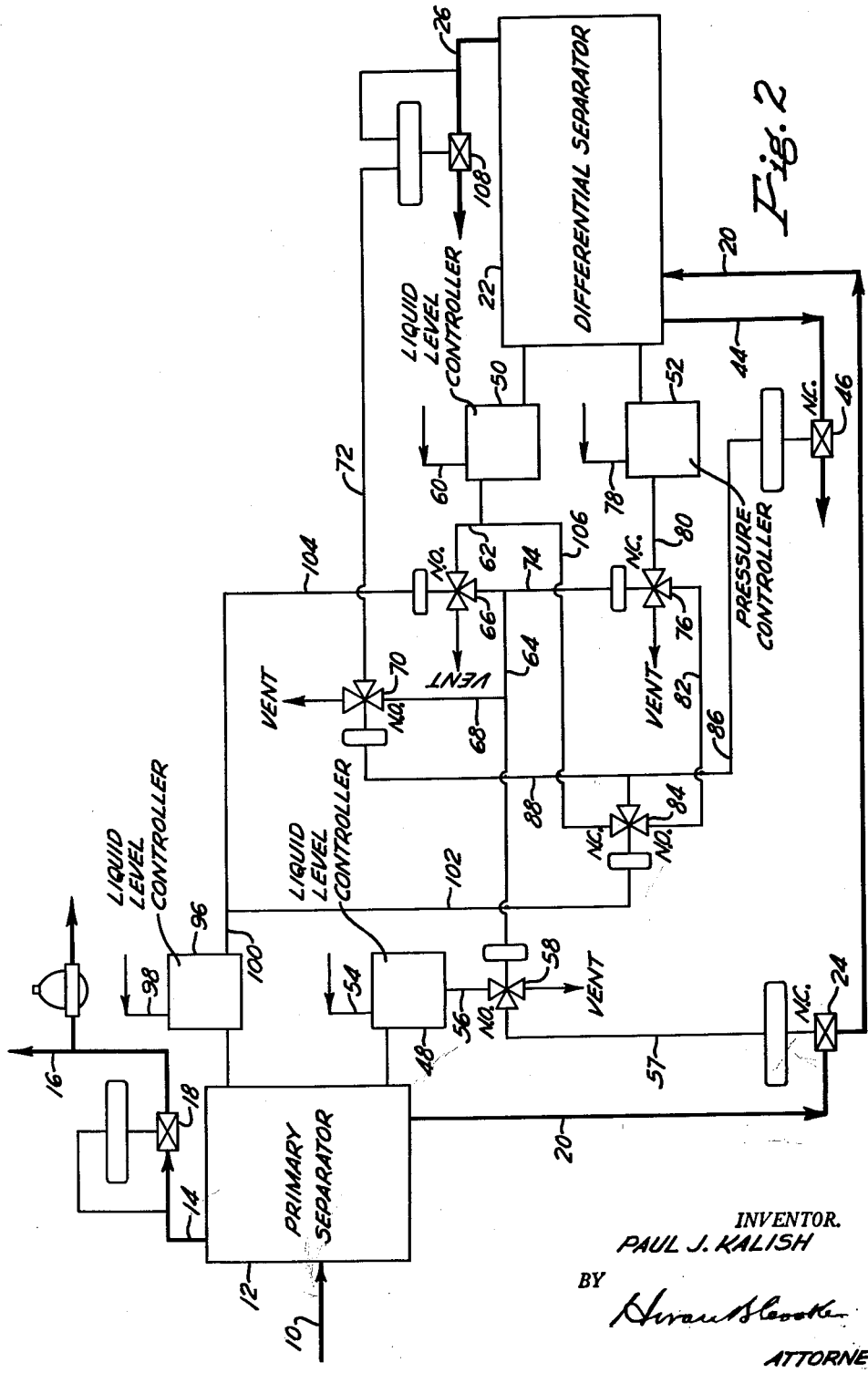

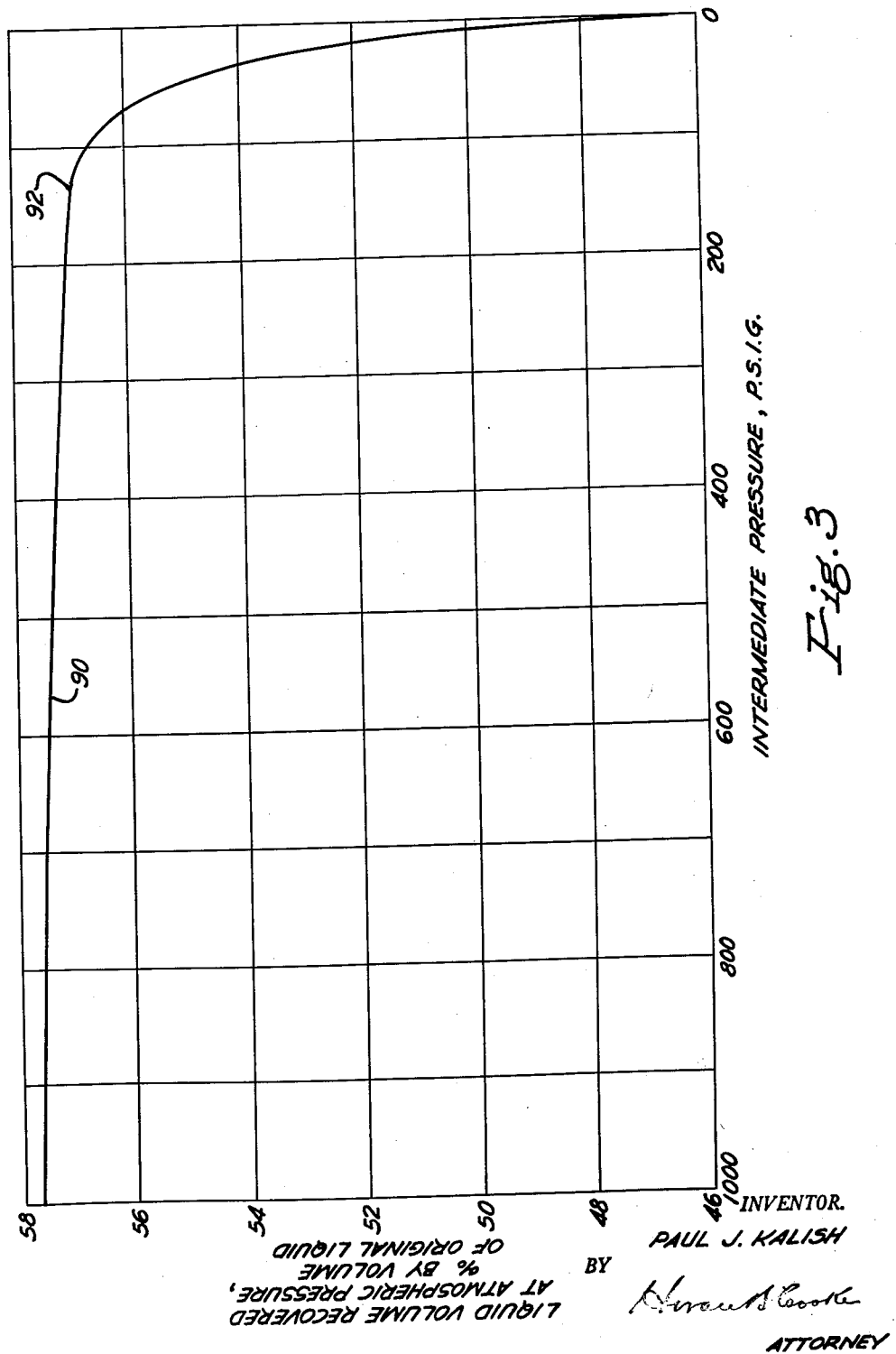

3,073,091
PROCESS AND APPARATUS FOR THE DIFFERENTIAL SEPARATION OF GASES FROM LIQUIDS
Paul J. Kalish, Houston, Tex., assignor to Gulf Oil Corporation, Pittsburgh, Pa., a corporation of Pennsylvania
Filed May 27, 1960, Ser. No. 32,194
19 Claims. (Cl. 55—21)

This invention relates to the separation of gases from liquids and more particularly to a differential separation process, and apparatus therefor, for the reduction of pressure on a liquid under high pressure containing gases dissolved therein.

Petroleum oils are generally found as mixtures of a large number of hydrocarbons ranging in volatility from permanent gases such as methane to very heavy liquid hydrocarbons of high boiling point. Frequently the oils exist in their natural state in the underground reservoir under high pressures which cause substantial amounts of normally gaseous hydrocarbons to dissolve in the heavier hydrocarbon liquids. Upon the reduction of pressure upon the liquid, gases dissolved in the liquid are liberated from the liquid. Frequently fluids produced from the reservoirs are rich in propane, butanes, pentanes, and hexanes and are under pressures high enough that those hydrocarbons are in the liquid state. When the pressure is reduced on the fluids produced from oil or gas condensate reservoirs, large quantities of the more volatile hydrocarbons may vaporize and separate from the remaining liquid products with a resultant low yield of the more valuable liquid products. The reduction in volume of liquids during separation processes is largest for liquids from gas condensate and near critical hydrocarbon reservoirs, since those liquids contain high concentrations of the more volatile hydrocarbons.

The usual field practice for the separation of the gaseous and liquid hydrocarbons resulting from the reduction from reservoir pressure is to pass a stream of the hydrocarbons under a high pressure continuously into a primary separator system in which the hydrocarbons are flashed to a lower pressure. Gas is continuously removed from the top of the separator and liquid is intermittently removed from the bottom and flashed to atmospheric pressure. The flashing process can cause a substantial loss in yield of liquid products, depending on the magnitude of the pressure drops and the composition of the hydrocarbon stream. The reduction in yield of liquid products at atmospheric pressure can be reduced by using a number of separators connected in series to cause a step-wise reduction in pressure. For example, gas condensate wells have been equipped with as many as four flash separators connected in series plus a stock tank. Although the step-wise reduction in pressure in a series of flash separators results in a higher yield of liquid products, it has the serious disadvantage of added costs of the additional separators.

One process that has been suggested to increase the yield of liquid products is the differential separation process in which a batch of the liquid under high pressure and containing gas dissolved and entrained therein is delivered into a separator and the pressure on the separator reduced by removal of gas from the separator from the high initial pressure to the low desired pressure while the liquid remains in the separator. The differential process as heretofore applied has had the disadvantage of reduced capacity of the separator equipment because of periods of appreciable length during which little or no separation occurs. Moreover, unless the differential separation process is continued to substantially atmospheric pressure, much of the savings of liquid made possible by a differential process are lost by flashing of volatile hydrocarbons from the liquid upon subsequent movement to storage at substantially atmospheric pressure.

This invention resides in an improved differential separation process for reducing the pressure on liquids containing dissolved and entrained gaseous constituents from an initial high pressure to a final low pressure in which the liquid is flashed to an intermediate pressure lower than the initial pressure during transfer into a differential separation vessel followed by the subsequent reduction of the pressure in a differential manner to the final desired pressure. The invention also includes within its scope apparatus for performing the differential separation process of this invention. This invention provides a method of increasing the capacity of differential separation equipment in which the differential reduction of the pressure on the liquid can be continued to substantially atmospheric pressure.

In the drawings:

FIGURE 1 is a diagrammatic illustration of a preferred embodiment of apparatus suitable for use in the novel process of this invention. The legend "N.O." adjacent valves indicates the valves are normally open and the legend "N.C." indicates the valves are normally closed.

FIGURE 2 is a diagrammatic illustration of a second embodiment of apparatus which can be used in a variation of the process of this invention. As in FIGURE 1, the legend "N.O." adjacent valves indicates the valves are normally open and the legend "N.C." indicates the valves are normally closed.

FIGURE 3 is a curve showing the yield of liquid product at substantially atmospheric pressure, in terms of the percentage by volume of the original high pressure hydrocarbon liquid which contains dissolved gases, obtained by a single stage flash to an intermediate pressure followed by differential separation of gas from the liquid accumulated at the intermediate pressure until the pressure on the liquid is reduced to substantially atmospheric pressure. The curve expresses the yield of liquid products at substantially atmospheric pressure as a function of the intermediate pressure to which the original liquid is flashed.

Referring to FIGURE 1, the well effluent containing the liquid under high pressure from which gases are to be separated on reduction of the pressure is supplied through a feed line 10 to a primary separator 12 having a gas outlet line 14 opening from its upper end for delivery of gases separated from liquid in the primary separator 12 to a gas delivery line 16. A back pressure valve 18, which may be of conventional design, is connected in line 14 to control the pressure on the primary separator 12. In some installations the primary separator 12 may merely ride on a sales gas line, in which event the pressure on the sales gas line determines the pressure on the primary separator. In those installations a pressure regulating valve is provided in feed line 10.

A liquid supply line 20 extending from the lower end of the primary separator 12 is connected into a differential separator vessel 22 for delivery of liquids from the primary separator 12 to the differential separator. Flow through the liquid supply line 20 is controlled by a normally closed liquid supply valve 24. A gas line 26 opens from the upper portion of the differential separator vessel 22 for delivery through a normally open gas reservoir valve 28 and a gas line 29 into a gas reservoir 30. A gas outlet line 32 branches from the gas line 26 between the differential separator vessel 22 and gas reservoir valve 28 for discharge of gas through a normally closed gas outlet valve 34 to suitable disposal means such as a flare. Pressure in the gas reservoir is regulated by a pressure regulating valve 36 in a gas discharge line 38 opening from the upper end of the gas reservoir. Gas is supplied from the gas reservoir to operate the pneumatic pressure and liquid level controllers through a gas supply line 40 equipped with a suitable pressure regulator 42. An alternate supply gas regulator is attached to the primary separator gas system to furnish another source of supply gas, if required. The flow of liquid discharged from the lower portion of the differential separator through a liquid discharge line 44 is controlled by a normally closed liquid discharge valve 46.

Control of the flow of fluids through the several lines is obtained by means of a liquid level controller 48 actuated by the level of the liquid in the primary separator 12, a liquid level controller 50 actuated by the level in the differential separator vessel 22, and a pressure controller 52 actuated by the pressure in the differential separator vessel 22.

Liquid supply valve 24, gas outlet valve 34, gas reservoir valve 28 and liquid discharge valve 46 are motor operated valves actuated by signals received from liquid level controllers 48 and 50 and pressure controller 52 to change them from their normal operating position. The motor operated valves illustrated in the drawings are diaphragm-type valves actuated by the pressure of supply gas controlled by controllers 48, 50, and 52. Other means of actuating the valves could be used. For example, the valves 24, 28, 34, and 46 could be actuated by electric motors which receive electric signals from controllers 48, 50, and 52.

Supply gas under pressure to actuate valve 24 is delivered to liquid level controller 48 through a line 54 and from liquid level controller 48 through lines 56 and 57 to the diaphragm or motor of liquid supply valve 24. A normally open control valve 58 between line 56 and line 57 allows transmission of the supply gas pressure to the valve 24.

The liquid level controller 50, which is actuated by the liquid level in the differential separator vessel 22, receives supply gas through a line 60 and delivers it through lines 62 and 64 to the diaphragm or motor of control valve 58. A normally open control valve 66 allows transmission of the gas pressure from line 62 through line 64 to the motor of control valve 58. Branching from line 64 is a supply gas transmission line 68 which is connected through a normally open control valve 70 to a line 72 extending to the motor of reservoir valve 28 and gas outlet valve 34. Since valves 28 and 34 are in opposite positions at all times a single motor is used to operate those valves. Whenever valve 28 is open, valve 34 is closed, and vice versa. A single three-way valve placing line 26 in communication with either suitable disposal means such as a flare or the gas reservoir could be used in place of valves 28 and 34. A second supply gas transmission line 74 branches from line 64 and extends to the motor of a control valve 76.

Pressure controller 52 receives supply gas through a line 78 and discharges that gas through a line 80 to one port of the control valve 76 which is normally closed. A supply gas transmission line 82 is connected with the central port of the control valve 76 and is connected through a normally open control valve 84 to a gas transmission line 86 to the motor of liquid discharge valve 46. Branching from line 86 which is connected to the central outlet of control valve 84 is a gas transmission line 88 connected to the motor of control valve 70.

Each of control valves 58, 66, 70, 76, and 84 is a three-way valve in which the middle port is in communication with one, but only one, of the other ports. Delivery of supply gas to the motor of the valves changes the position of the valve from its normal position to place the central port in communication with the port other than the port normally in communication therewith. For example, control valves 66 and 70 are normally open to permit flow of the supply gas from the liquid level controller 50 through one port of the valves to the central port. Application of supply gas pressure to the motor of those control valves vents the lines 64 and 72, respectively. Control valve 84 can be changed from its normally open position between line 82 and the central port only in the event a second liquid level controller such as 96 is used on the primary separator. Similarly, control valve 66 can be changed from its normally open position between line 62 and the central port only in the event a second liquid level controller such as 96 is used on the primary separator.

In the operation of the apparatus illustrated in FIGURE 1, it will be assumed that the liquid level in differential separator 22 is at the predetermined lower level designed to reset the liquid level controller 50. At this level the liquid level controller 50 does not allow supply gas to pass from it into line 62. The well effluent including liquid under pressure flows through line 10 into the primary separator in which gas is separated from the liquid at the high pressure regulated by back pressure valve 18. Liquid level controller 48 delivers supply gas under pressure through line 56, normally open valve 58, and line 57 to the motor of liquid supply valve 24 and opens that valve when the liquid level in the primary separator is above a predetermined intermediate level. Liquid level controller 48 discontinues the supply of supply gas to the motor of valve 24 and closes that valve when the liquid level in the primary separator falls to a predetermined lower level. Because no supply gas flows at this time through line 62 and, hence, through lines 64, 68, and 72 to the motor for valves 28 and 34, gas reservoir valve 28 is in its normally open position and valve 34 in its normally closed position. Since valve 28 is open, pressure equilibrium exists between the gas reservoir 30 and the differential separator 22 at some pressure below the intermediate pressure setting of back pressure valve 36 during the flow of fluids through liquid supply line 20 into the differential separator vessel.

The maximum pressure in the gas reservoir is controlled by pressure regulating valve 36 at a predetermined intermediate pressure lower than the pressure on the primary separator 12 and above the pressure exerted on the liquid in the differential separator prior to its discharge from the differential separator. During the influx of fluids into the differential separator through supply line 20, the pressure in the differential separator and gas reservoir will rise to and be maintained at the predetermined intermediate pressure controlled by valve 36. The pressure controller 52 at this stage of the cycle allows supply gas to be transmitted under pressure into line 80 but the normally closed valve 76, which vents line 82, prevents flow of supply gas to the motor of liquid discharge valve 46; hence, valve 46 is in its normally closed position. When the pressure in the differential separator rises to a predetermined level below the setting of back pressure regulator 36, pressure controller 52 resets and does not allow supply gas to be transmitted under pressure into line 80.

When the liquid level in the differential separator vessel 22 rises to the upper predetermined level, liquid level controller 50 allows supply gas to flow through line 62 and then through normally open valve 66 and line 64 to the motor of control valve 58. Control valve 58 vents line 57 whereupon valve 24 resumes its normally closed position. Supply gas under pressure also passes through the normally open valve 70 to line 72 and to the motor of gas reservoir valve 28 and gas outlet valve 34 to close valve 28 and open valve 34. Gas from the differential separator vessel 22 is then allowed to bleed through gas line 26, gas outlet line 32, and gas outlet valve 34 until the pressure in the differential separator vessel drops to a desired final low pressure. It is one of the advantages of the apparatus and process of this invention that the pressure in the differential separator vessel 22 can be reduced to substantially atmospheric pressure without decreasing the recovery of gas from the primary separator.

When the pressure in the differential separator vessel 22 reaches the desired final low pressure, supply gas pressure is delivered by the pressure controller into line 80. At this time, the liquid level controller 50 is allowing flow of supply gas through line 62 and normally open valve 66 into branch line 74 to the motor of control valve 76 whereupon the control valve is changed from its normally closed position to allow flow of supply gas from line 80 into line 82. The supply gas pressure is then transmitted through line 82, normally open valve 84, and line 86 to the motor of liquid discharge valve 46 to open that valve. Supply gas from valve 84 also flows through line 88 to the motor of valve 70 to vent line 72, whereupon gas outlet valve 34 returns to its normally closed position and reservoir valve 28 returns to its normally open position. The pressure in the gas reservoir is thereby again applied to the differential separator vessel and speeds the flow of liquid from the differential separator vessel 22 through the liquid discharge line 44 and valve 46 to the storage tank.

When the liquid level in the differential separator vessel 22 falls to a predetermined low level, the liquid level controller 50 stops the supply of gas to lines 62, 64, and 74. Control valves 58 and 76 then return to their normal positions. Supply gas pressure from liquid level controller 48 can then be transmitted when necessary through line 56, control valve 58, and line 57 to liquid supply valve 24 to open that valve and allow liquid from the primary separator to again flow in the differential separator vessel 22 to start another cycle. When control valve 76 reverts to its normally closed position, supply gas furnished by pressure controller 52 cannot flow from line 80 through valve 76, and lines 82, 86, and 88 are vented, which reverts valves 70 and 46 to their normal positions. When the pressure on the differential separator vessel 22 rises to a level slightly below the normal pressure of the gas reservoir 30, the pressure controller 52 resets and prevents flow of supply gas to line 80.

Selection of a gas reservoir 30 and a differential separator 22 of certain sizes relative to one another will allow the pressure regulating valve 36 on the gas reservoir 30 to be eliminated. During filling of the differential separator 22 the pressure controller 52 and the liquid level controller 50 would actuate valves 28 and 34 and isolate the gas reservoir 30 before the pressure reached the level at which regulating valve 36 functions.

It will be noted that during the transfer of a batch of liquid from the primary separator 12 into the differential separator 22, a flash separation of the liquid occurs as a result of the reduction of the pressure from the pressure in the primary separator to the intermediate pressure existing in the reservoir. Suitable control of the pressure in the gas reservoir with respect to the pressure in the primary separator prevents any significant, ultimate loss of yield of liquid compared with differential separation alone as a result of this flash separation.

Referring to FIGURE 3 of the drawings, curve 90 shows the liquid volume recovered at atmospheric pressure when a crude oil saturated with gases under a pressure of 1000 p.s.i.g. is flashed in a single stage operation to various lower intermediate pressures and the liquid product resulting from the flash is differentially separated from its solution gases until substantially atmospheric pressure is reached. Separation of gases from the original liquid occurs by a single stage flash process between the original 1000 p.s.i.g. pressure and the selected intermediate pressure. Separation of gases from the liquid recovered at the selected intermediate pressure occurs by the differential separation process between the selected intermediate pressure and atmospheric pressure. Curve 90 is substantially a straight line with no appreciable change in slope in the pressure interval in which the intermediate pressure varies between 1000 p.s.i.g. and the pressure indicated by point 92 on curve 90. As the intermediate pressure decreases below the pressure indicated by point 92, the slope of curve 90 increases rapidly and the yield of liquid recovered at atmospheric pressure is reduced. The slope of curve 90 approaches its maximum as the intermediate pressure approaches atmospheric pressure. Curve 90 shows that flash separation to such intermediate pressures near atmospheric pressure will result in the lowest yields of liquid. The intermediate pressure indicated by point 92, below which the change in the slope of curve 90 becomes appreciable, depends upon the particular mixture of liquid and gaseous ingredients being separated.

It will be noted that, at all intermediate pressures above the pressure indicated by point 92 on curve 90 the yield of liquid obtained on subsequent differential separation to atmospheric pressure is substantially the same. For the hydrocarbon composition for which FIGURE 3 was prepared, substantially the same yield of liquid at atmospheric pressure will be obtained if the original liquid at 1000 p.s.i.g. is flashed to a 600 p.s.i.g. intermediate pressure and then differentially separated to atmospheric pressure, or if the original liquid is flashed to 155 p.s.i.g. and then differentially liberated to atmospheric pressure. In this process the intermediate pressure on the gas reservoir and differential separator is preferably maintained at a pressure corresponding to the pressure at point 92 or slightly higher than the pressure indicated at point 92. Proper selection of the relative sizes of gas reservoir 30 and differential separator 22 and the setting of pressure regulating valve 36 will insure the pressure on the differential separator 22 exceeding a pressure corresponding to point 92 at all times except during the later stages of the differential separation. Then the flash distillation that occurs as a batch of liquid is delivered from the primary separator 12 into the differential separator 22 results in substantially no loss in yield of liquid products recovered at atmospheric pressure above the loss that would occur on differential separation alone. Ordinarily the intermediate pressure at which the change in slope of the curve of yield of liquid product versus the intermediate pressure becomes substantial is in the range of about 100 to 300 p.s.i.a.

In addition to allowing flash separation of gas and liquid to occur during the transfer of fluids into the differential separator vessel, the apparatus illustrated in FIGURE 1 causes rapid transfer of the gas and liquid to the differential separator and rapid discharge of the liquid from the differential separator vessel after the pressure on the accumulated liquid has been reduced to the desired final pressure. Even if the differential separation continues substantially to atmospheric pressure, the application of the gas reservoir pressure on the surface of the liquid in the differential separator vessel 22 during the discharge of the liquid causes rapid discharge of the liquid through liquid discharge line 44.

The apparatus illustrated in FIGURE 1 has been described for an installation where there is an initial reduction of the pressure in feed line 10 that takes place in the primary separator 12. It will be noted that the liquid level controller 48 merely makes sure that there is liquid in the primary separator 12 whenever valve 24 is open. The feed line 10 could be connected directly to line 20 for delivery directly into differential separator vessel 22 without the reduction in pressure that occurs in primary separator 12. Valve 24 would then be operated only in response to signals from the liquid level controller 50.

The apparatus illustrated in FIGURE 1 has been provided with a second liquid level controller 96 connected to the primary separator 12 to prevent overfilling it. Liquid level controller 96 furnishes supply gas from a supply line 98 to a supply gas line 100 should the liquid level in separator 12 reach a predetermined upper level higher than that which actuates liquid level controller 48. The supply gas under pressure is then delivered through a line 102 to the motor of control valve 84 and a line 104 to the motor of valve 66 to change the settings of those valves from their normal positions. Valve 66 will then vent line 64 to inactivate the motor of control valve 58 whereupon supply gas is supplied through lines 56 and 57 to the motor of valve 24 to hold that valve in the open position and cause liquid to discharge from the primary separator through valve 24 and line 20 into the differential separator. The continued influx of liquid into the differential separator will activate liquid level controller 50, if it is not already activated, and liquid level controller 50 will furnish supply gas to line 62. Supply gas is then supplied through a supply gas line 106 from line 62 through valve 84 and line 86 to the motor of liquid discharge valve 46 to maintain that valve in the open position. Supply gas under pressure from line 106 also flows through valve 84 to line 88 and to the motor of valve 70 whereupon line 72 is vented and valves 28 and 34 remain in or revert to their normal positions. Thus, if the liquid level in the primary separator 12 rises above a predetermined upper level because of excessive liquid flow rates in line 10, the liquid supply valve 24, liquid discharge valve 46 and gas reservoir valve 28 remain open and differential separator vessel 22 acts as a flash separator allowing continuous flow of liquid and gas from the vessel until the excessive liquid flow rate is corrected.

The following examples illustrate the advantage of the process of this invention by which recovery of substantially the same volume of liquid by a combination of a flash and differential separation as by differential separation alone can be obtained.

EXAMPLE 1

A hydrocarbon liquid containing dissolved gases at a pressure of 505 p.s.i.a. from a gas condensate well was initially flashed to an intermediate pressure and then the liquid and gas were separated by a differential process in which the final pressure was 15 p.s.i.a. The volumetric ratio of the liquid remaining at the end of the differential separation to the liquid delivered to the flash separation at the intermediate pressure was determined for each intermediate pressure. The results are presented in Table I.

Table I

| Intermediate Pressure (p.s.i.a.) | Ratio of Volume of Liquid at Final Pressure to Liquid Delivered to Flash Distillation |
|---|---|
| 15 | .749 |
| 95 | .825 |
| 175 | .831 |
| 355 | .833 |
| 505 | .834 |

It will be noted from Table I that the volume of liquid recovered by a combination of the flash separation to the intermediate pressure of 175 p.s.i.a. followed by differential separation to atmospheric pressure allows recovery of substantially the same volume of liquid as is recovered by differential separation all of the way from 505 p.s.i.a. to atmospheric pressure. An initial reduction in the pressure on the liquid of 330 p.s.i. by the flash process results in a drop in the volumetric ratio of only .003. However, a further drop of 80 p.s.i. results in a decrease in the volumetric ratio of .006. Thus, the pressure corresponding to the pressure at 92 in FIGURE 3 of the drawing, at which there is a substantial change of slope in the volume of liquid-final pressure curve, is approximately 155 p.s.i.a.

EXAMPLE 2

The procedure described for Example 1 was repeated with a liquid from a high pressure separator. The liquid containing dissolved gases at 1037 p.s.i.a. was passed through an initial flash distillation at an intermediate pressure. Gas was removed from a batch of liquid resulting from that flash distillation in a differential separation to atmospheric pressure. The following results were obtained.

Table II

| Intermediate Pressure (p.s.i.a.) | Ratio of Volume of Liquid at Final Pressure to Liquid Delivered to Flash Distillation |
|---|---|
| 15 | .467 |
| 65 | .551 |
| 115 | .567 |
| 215 | .571 |
| 315 | .573 |
| 415 | .574 |

It will be noted that when the intermediate pressure is 200 p.s.i. less than the highest intermediate pressure used that the reduction in volumetric ratio is only .003. If the reduction in pressure from the highest intermediate pressure is 300 p.s.i. the reduction in volumetric ratio rises to .007. A reduction of 350 p.s.i. below the highest intermediate pressure results in a reduction in the volumetric ratio of .023. The intermediate pressure at which the slope of the liquid volume-intermediate pressure curve begins to change rapidly is approximately 155 p.s.i.a.

EXAMPLE 3

A mixture of hydrocarbons was obtained by the recombination of primary separator samples of gas and oil in the ratio of the producing gas-oil ratio. The resulting single phase fluid under a pressure of 4700 p.s.i.a. was separated in a flash separator operated at an intermediate pressure and the liquid from that flash separator reduced to atmospheric pressure in a differential separation. The liquid recovery for several differential intermediate pressures is presented in Table III.

Table III

| Intermediate Pressure (p.s.i.a.) | Ratio of Volume of Liquid at Final Pressure to Liquid Delivered to Flash Distillation |
|---|---|
| 15 | .261 |
| 190 | .346 |
| 255 | .349 |
| 415 | .353 |

A reduction of the intermediate pressure from 415 to 255 p.s.i.a. resulted in a reduction in the volumetric ratio of only .004. A further reduction of the intermediate pressure of 65 p.s.i. resulted in a further reduction of the volumetric ratio of .003. Thus, appreciable changing in slope of the curve of liquid recovered versus intermediate pressure commences at a pressure of approximately 235 p.s.i.a.

The embodiment of the invention illustrated in FIGURE 2 of the drawings is identical with the embodiment illustrated in FIGURE 1 with the exception of the apparatus for handling the gas discharged from differential separator vessel 22. Connected in the gas line 26 is a back pressure valve 108 set to maintain a pressure on the differential separator vessel 22 equal to the intermediate pressure at which the differential separation is initiated in the absence of any signal from the control system. The back pressure valve 108 illustrated is a diaphragm-type valve in which the pressure on the differential separator is transmitted to the top of the diaphragm. An increase in the pressure on the differential separator vessel 22 will open valve 108 to regulate the pressure at the desired level. Supply gas transmission line 72 is also connected above the diaphragm in the back pressure valve 108. When the liquid level in the differential separator vessel 22 rises to the upper predetermined level, supply gas is supplied through the liquid level controller 50 and lines 62, 64, and 68 and 72 to valve 108 above the diaphragm. The pressure of the supply gas opens valve 108 and allows the differential separation to proceed. Upon reduction of the pressure to the final predetermined pressure, the pressure controller 52 cuts off the supply of supply gas to the motor of valve 108 and that valve is closed. The liquid discharge valve 46 simultaneously opens for delivery of oil from the differential separator vessel 22 to the stock tank.

The relatively low pressure on the differential separator at all stages of the separating cycle permits the differential separator vessel to be of relatively light construction and thereby markedly reduces the cost of the vessel. Moreover, the low pressure on the differential separator does not result in an appreciable loss in yield of liquid products. As shown by the data presented in the several examples, and the typical curve of FIGURE 3, the flashing of the liquid to the intermediate pressure followed by differential separation from the intermediate pressure to the final pressure can be made substantially without loss of yield of liquid products as compared with differential separation during a reduction of the pressure from the pressure of the primary separator to the final pressure on the liquid.

The reapplication of the pressure in the gas reservoir onto the liquid in the differential separator for discharge of the liquid from the differential separator has the additional effect of increasing the yield of liquid products. In the process of this invention, it is possible to allow the differential separation to proceed until the pressure has been reduced to atmospheric pressure. The reapplication of the pressure of the gas reservoir onto the liquid provides the driving force necessary to remove the liquid from the differential separator. An inspection of FIGURE 3 of the drawing shows that the largest loss in yield of liquid products occurs by flash separation from a few pounds above atmospheric pressure down to atmospheric pressure. In the processes heretofore available, it was the usual practice to continue the differential separation to a final pressure somewhat above atmospheric in order to retain sufficient pressure on the differential separator for effective removal of liquid from the separator vessel. On delivery from the differential separator to storage at atmospheric pressure, flash separation with a consequent loss in liquid volume would occur.

I claim:

1. A process for the separation of gases evolved from a liquid under an initial high pressure containing the gases upon reduction of the pressure to a final desired pressure comprising delivering a batch of the liquid from the high pressure source into a vessel in communication with a source of gas at an intermediate pressure lower than the high pressure and higher than the final desired pressure, discontinuing flow of the liquid into the vessel, isolating the vessel from the source of gas at the intermediate pressure, then discharging gas from the vessel to lower the pressure in the vessel to the desired final pressure while retaining the liquid in the vessel, then placing the vessel in communication with the source of gas at intermediate pressure, then withdrawing liquid from the vessel and delivering another batch of liquid from the high pressure source into the vessel for repeating the cycle.

2. A process as set forth in claim 1 in which the liquid is a mixture of hydrocarbons, the gases are volatile hydrocarbons, and the intermediate pressure is above about 100 p.s.i.a.

3. A process as set forth in claim 1 in which the intermediate pressure is higher than the lowest pressure at which the change in slope of the curve of yield of liquid product versus the intermediate pressure in the vessel is substantially zero and less than the pressure of the high pressure source.

4. A process for the separation of gases evolved from a liquid under high pressure containing the gases upon reduction of the pressure to a final desired pressure comprising delivering a batch of the liquid from the high pressure source into a vessel in communication with a source of gas at an intermediate pressure lower than the high pressure and higher than the final desired pressure, discontinuing flow of the liquid into the vessel, isolating the vessel from the source of gas, then discharging gas from the vessel to lower the pressure in the vessel to the desired final pressure while retaining the liquid in the vessel, placing the vessel in communication with the source of gas to raise the pressure in the vessel, discharging liquid from the vessel under the pressure of gas from the gas source, and then delivering another batch of liquid from the high pressure source into the vessel for repeating the cycle.

5. A process as set forth in claim 4 in which the final desired pressure is substantially atmospheric pressure.

6. A process for the separation of gaseous hydrocarbons from a solution of said gaseous hydrocarbons in liquid hydrocarbons at a high pressure comprising flashing the liquid hydrocarbons containing the dissolved gaseous hydrocarbons continuously into a flash separator maintained at a first substantially constant pressure lower than the pressure on the liquid hydrocarbons whereby gas is liberated from the liquid hydrocarbons, continuously removing gases from the separator, periodically delivering a batch of liquid hydrocarbon from the separator into a vessel maintained at an intermediate pressure lower than the pressure in the separator and higher than the final desired pressure, discontinuing flow of the liquid into the vessel, discharging gas from the vessel to lower the pressure in the vessel to the desired final pressure while retaining the liquid in the vessel, and then raising the pressure in the vessel to substantially the intermediate pressure and withdrawing the remaining liquid from the vessel, and delivering another batch of liquid from the separator to the vessel for repeating the cycle.

7. Apparatus for separating gas and liquid from a liquid at a high pressure containing the gas comprising a differential separator vessel, a gas reservoir, a liquid supply line opening into the separator vessel, a gas outlet line opening from the upper portion of the vessel, conduit means connecting the upper portion of the differential separator vessel with the gas reservoir, a liquid discharge line opening from the lower portion of the vessel, a liquid supply valve in the liquid supply line, a gas outlet valve in the gas outlet line, a gas reservoir valve in the conduit means connecting the differential separator tank with the gas reservoir, a liquid discharge valve in the liquid discharge line, a liquid level controller actuated by the level of the liquid in the differential separator vessel adapted to close the liquid supply valve and the gas reservoir valve and open the gas outlet valve when the liquid level in the vessel reaches a predetermined upper level and to close the liquid discharge valve and open the liquid supply valve when the liquid level reaches a predetermined lower level, and a pressure controller adapted to close the gas outlet valve and open the liquid discharge valve and the gas reservoir valve when the pressure in the differential separator vessel reaches a predetermined desired low pressure.

8. Apparatus for separating gas and liquid from liquid hydrocarbons at a high pressure having gaseous hydrocarbons dissolved therein comprising a primary separator, a gas discharge line from the upper portion of the primary separator, means in said gas discharge line for controlling the pressure in the primary separator, a differential separator vessel, a liquid supply line from the lower portion of the primary separator into the differential separator vessel, a gas outlet line opening from the upper portion of the vessel, a gas reservoir, conduit means connecting the upper portion of the differential separator vessel with the gas reservoir, a liquid discharge line opening from the lower portion of the differential separator vessel, a liquid supply valve in the liquid supply line, a gas outlet valve in the gas outlet line, a gas reservoir valve in the conduit means connecting the differential separator tank with the gas reservoir, a liquid discharge valve in the liquid discharge line, a liquid level controller actuated by the level of the liquid in the differential separator vessel adapted to close the liquid supply valve and to close the gas reservoir valve and open the gas outlet valve when the liquid level in the vessel reaches a predetermined upper level and to close the liquid discharge valve and open the liquid supply valve when the liquid level reaches a predetermined lower level, and a pressure controller adapted to close the gas outlet valve, open the gas reservoir valve and open the liquid discharge valve when the pressure in the vessel reaches a predetermined desired low pressure.

9. Apparatus for separating gas and liquid from a liquid at a high pressure containing the gas comprising a differential separator vessel, a liquid supply line opening into the vessel, a gas outlet line opening from the upper portion of the vessel, a liquid discharge line opening from the lower portion of the vessel, a valve in the liquid supply line, back-pressure valve means in the gas outlet line for maintaining an intermediate pressure on the vessel, a liquid discharge valve in the liquid discharge line, a liquid level controller actuated by the level of the liquid in the differential separator vessel adapted to close the liquid supply valve and inactivate the back-pressure valve means to allow flow through the gas outlet line independent of the pressure in the vessel when the liquid level in the vessel reaches a predetermined upper level and to close the liquid discharge valve and open the valve in the liquid supply line when the liquid level reaches a predetermined lower level, and a pressure controller adapted to reactivate the back-pressure valve means in the gas outlet line and open the liquid discharge valve when the pressure in the differential separator vessel reaches a predetermined low pressure.

10. Apparatus for separating gas from a liquid at a high pressure containing the gas comprising a primary separator, a differential separator vessel, and a gas reservoir, means for introducing the liquid containing the gas into the primary separator, a liquid supply line extending from the lower portion of the primary separator to the differential separator vessel, a normally closed liquid supply valve in said liquid supply line, a gas line connecting the upper portion of the differential separator vessel with the gas reservoir, a normally open gas reservoir valve in said gas line, a gas outlet line communicating with the upper portion of the differential separator vessel, a normally closed gas outlet valve in said gas outlet line, a liquid discharge line opening from the lower portion of the differential separator vessel, a normally closed liquid discharge valve in said liquid discharge line, control means acauted by the liquid level in the differential separator vessel adapted to close the gas reservoir valve and the liquid supply valve and open the gas outlet valve when the liquid level in the differential separator vessel reaches a predetermined upper level and to close the liquid discharge valve and open the liquid supply valve when the liquid level in the differential separator vessel reaches a predetermined lower level, and control means actuated by the pressure in the differential separator vessel adapted to open the liquid discharge valve and return the gas reservoir valve and gas outlets to the normal position when the presusre in the differential separator vessel reaches a predetermined low pressure.

11. Apparatus as set forth in claim 10 in which control means for preventing overfilling of the primary separator are actuated by the liquid level in the primary separator and are adapted to supply a signal to open the liquid supply valve, open the liquid discharge valve, and maintain the gas reservoir valve and the gas outlet valve in the normal position when the liquid level in the primary separator reaches a predetermined upper level, and said control means are adapted to be deactivated when the liquid level in the primary separator falls to a predetermined lower level.

12. A process for the separation of hydrocarbon gases evolved from a mixture of liquid hydrocarbons containing the gases under an initial high pressure upon reduction of the pressure to a final desired pressure comprising delivering a batch of the liquid hydrocarbons from a high pressure source into a vessel in communication with a gas reservoir at a first pressure lower than the high pressure and higher than the final desired pressure, allowing the pressure in the vessel and the gas reservoir to rise to an intermediate pressure higher than the first pressure and lower than the high pressure, discontinuing flow of the liquid hydrocarbons into the vessel, isolating the vessel from the gas reservoir, then discharging gaseous hydrocarbons from the vessel to lower the pressure in the vessel to the desired final pressure while retaining liquid hydrocarbons in the vessel, then delivering liquid from the vessel and placing the vessel in communication with the gas reservoir at the intermediate pressure whereby the pressure on the vessel and gas reservoir falls to the first pressure, discontinuing the delivery of liquid from the vessel, and delivering another batch of liquid from the high pressure source into the vessel for repeating the cycle.

13. A process as set forth in claim 12 in which the intermediate pressure is higher than the lowest pressure at which the change in slope of the curve of yield of liquid product versus the intermediate pressure in the vessel is substantially zero and less than the pressure of the high pressure source.

14. A process as set forth in claim 12 in which the first pressure is higher than the lowest pressure at which the change in slope of the curve of yield of liquid product versus the intermediate pressure in the vessel is substantially zero and less than the pressure of the high pressure source.

15. Apparatus for separating gas and liquid from a liquid containing the gas at high pressure comprising a differential separator vessel, a liquid supply line opening into the vessel, a gas outlet line opening from the upper portion of the vessel, a liquid discharge line opening from the lower portion of the vessel, a liquid supply valve in the liquid supply line, means communicating with the gas outlet line for maintaining an intermediate pressure on the vessel and discharging gas from the system, a liquid discharge valve in the liquid discharge line, a liquid level controller actuated by the level of a liquid in a differential separator vessel adapted to close the liquid supply valve and inactivate the means for maintaining the intermediate pressure to allow flow through the gas outlet line when the liquid level in the vessel reaches a predetermined upper level and to close the liquid discharge valve and open the liquid supply valve when the liquid level reaches a predetermined lower level, and a pressure controller adapted to open the liquid discharge valve and to reactivate the means for maintaining the intermediate pressure when the pressure in the differential separator reaches a predetermined low pressure.

16. In a process for the differential separation of hydrocarbon gases from hydrocarbon liquids in which a hydrocarbon liquid containing hydrocarbon gases is delivered from a primary separator at a high pressure to a differential separator, and gas is liberated from the liquid in the differential separator while the pressure in the differential separator is reduced to a desired final pressure to cause differential separation of the gas from the liquid, the improvement comprising raising the pressure in the differential separator to a pressure above the desired final pressure but below the high pressure of the primary separator prior to delivering liquid from the primary separator into the differential separator.

17. In a process for the differential separation of hydrocarbon gases from hydrocarbon liquids in which a hydrocarbon liquid containing hydrocarbon gases is delivered from a primary separator at a high pressure to a differential separator, and gas is liberated from the liquid in the differential separator while the pressure in the differential separator is reduced from an intermediate pressure lower than the high pressure in the primary separator to a desired final pressure to cause differential separation of the gas from the liquid, the improvement comprising raising the pressure in the differential separator to substantially the intermediate pressure prior to delivering a liquid from the primary separator into the differential separator.

18. A process as set forth in claim 1 in which the intermediate pressure is higher than the highest pressure at which the change in slope of the curve of yield of liquid product versus intermediate pressure in the vessel is finite and is less than the pressure of the high pressure source.

19. A process as set forth in claim 12 in which the intermediate pressure is higher than the highest pressure at which the change in slope of the curve of yield of liquid product versus the intermediate pressure in the vessel is finite and is less than the pressure of the high pressure source.

References Cited in the file of this patent

UNITED STATES PATENTS

| | | |
|---|---|---|
| 2,021,394 | Wade | Nov. 19, 1935 |
| 2,337,254 | Legatski | Dec. 21, 1943 |